(12) United States Patent
Brack et al.

(10) Patent No.: US 7,674,872 B2
(45) Date of Patent: Mar. 9, 2010

(54) METHOD OF PRODUCING HIGH MOLECULAR WEIGHT POLYMER

(75) Inventors: Hans-Peter Brack, Herrliberg (CH); Maarten Antoon Jan Campman, Churra-Murcia (ES); Hans Looij, Bergen op Zoom (NL); Laurus van der Wekke, Rucphen (NL); Dennis James Patrick Maria Willemse, Standdaarbuiten (NL)

(73) Assignee: Sabic Innovative Plastics IP B.V., Bergen op Zoom (NL)

( * ) Notice: Subject to any disclaimer, the term of this patent is extended or adjusted under 35 U.S.C. 154(b) by 0 days.

(21) Appl. No.: 12/140,694

(22) Filed: Jun. 17, 2008

(65) Prior Publication Data

US 2009/0312503 A1    Dec. 17, 2009

(51) Int. Cl.
*C08G 64/00* (2006.01)
*C08G 63/02* (2006.01)

(52) U.S. Cl. ............. 528/196; 166/250.1; 166/271.1; 166/288; 166/302; 264/176.1; 264/219; 528/198

(58) Field of Classification Search ............. 166/288, 166/302, 250.01, 271.1; 528/196, 198; 264/176.1, 264/219
See application file for complete search history.

(56) References Cited

U.S. PATENT DOCUMENTS

| | | | |
|---|---|---|---|
| 4,323,668 A | 4/1982 | Brunelle | |
| 4,506,066 A | 3/1985 | Medem et al. | |
| 5,091,591 A | 2/1992 | Cipullo | |
| 5,151,491 A | 9/1992 | Sakashita et al. | |
| 5,276,129 A | 1/1994 | Sakashita et al. | |
| 5,525,701 A | 6/1996 | Tominari et al. | |
| 5,696,222 A | 12/1997 | Kaneko et al. | |
| 6,063,464 A | 5/2000 | Charbonneau et al. | |
| 6,177,536 B1 | 1/2001 | Anamizu et al. | |
| 6,252,036 B1 | 6/2001 | Hatono et al. | |
| 6,300,459 B1 | 10/2001 | Kaneko et al. | |
| 6,303,734 B1 | 10/2001 | Funakoshi et al. | |
| 6,399,739 B1 | 6/2002 | McCloskey et al. | |
| 6,403,754 B1 | 6/2002 | McCloskey et al. | |
| 6,410,777 B1 | 6/2002 | Kaneko et al. | |
| 6,417,291 B1 | 7/2002 | Kaneko et al. | |
| 6,420,512 B1 | 7/2002 | McCloskey et al. | |
| 6,420,588 B1 | 7/2002 | McCloskey et al. | |
| 6,469,192 B1 | 10/2002 | Burnell et al. | |
| 6,486,294 B1 | 11/2002 | Brack et al. | |
| 6,500,914 B1 | 12/2002 | Brack et al. | |
| 6,506,871 B1 | 1/2003 | Silvi et al. | |
| 6,518,391 B1 | 2/2003 | McCloskey et al. | |
| 6,525,163 B1 | 2/2003 | Kimura et al. | |
| 6,548,623 B2 | 4/2003 | Brunelle et al. | |
| 6,590,068 B2 | 7/2003 | Brack et al. | |
| 6,600,004 B1 | 7/2003 | McCloskey et al. | |
| 6,653,434 B2 | 11/2003 | Brack et al. | |
| 6,706,846 B2 | 3/2004 | Brack et al. | |
| 6,710,156 B2 | 3/2004 | Whitney et al. | |
| 6,723,823 B2 | 4/2004 | McCloskey et al. | |
| 6,734,277 B2 | 5/2004 | Brack et al. | |
| 6,734,278 B2 | 5/2004 | Kratschmer et al. | |
| 6,747,119 B2 | 6/2004 | Brack et al. | |
| 2002/0132957 A1 | 9/2002 | Brack et al. | |
| 2003/0139564 A1 | 7/2003 | Kratschmer et al. | |
| 2004/0068086 A1 | 4/2004 | Day et al. | |
| 2004/0087756 A1 | 5/2004 | Ramesh et al. | |
| 2005/0234211 A1 | 10/2005 | Martinez et al. | |
| 2006/0069228 A1 | 3/2006 | McCloskey et al. | |
| 2007/0119041 A1 | 5/2007 | Mascarenas et al. | |
| 2007/0135611 A1 | 6/2007 | Brack et al. | |
| 2007/0299241 A1* | 12/2007 | Domingo et al. | ............ 528/371 |
| 2008/0004417 A1 | 1/2008 | Jansen et al. | |
| 2008/0004418 A1 | 1/2008 | Jansen et al. | |
| 2008/0097071 A1 | 4/2008 | Kamps et al. | |
| 2009/0088538 A1* | 4/2009 | Campman et al. | ............. 526/65 |

FOREIGN PATENT DOCUMENTS

| | | |
|---|---|---|
| EP | 0033089 | 8/1981 |
| JP | 5009282 A2 | 1/1993 |
| JP | 10101786 A2 | 4/1998 |
| JP | 10101787 A2 | 4/1998 |
| JP | 11302228 A2 | 11/1999 |
| JP | 2000129112 A | 5/2000 |
| JP | 2002309015 A2 | 10/2002 |
| JP | 200856844 A | 3/2008 |
| WO | 03040208 A1 | 5/2003 |
| WO | 03070804 A1 | 8/2003 |
| WO | 03106149 A1 | 12/2003 |

* cited by examiner

*Primary Examiner*—Terressa M Boykin
(74) *Attorney, Agent, or Firm*—Larson & Anderson, LLC

(57) ABSTRACT

The present invention provides methods of producing high molecular weight polymer. A method of forming polycarbonate includes the step of combining in a reaction mixture a diaryl carbonate, a transesterification catalyst, an aliphatic dihydroxy compound, and a diacid compound in a reactor system. The temperature and pressure of the reactor system are adjusted to a first reactor setpoints and the reaction mixture is monitored to detect initiation of the exothermic oligomerization reaction. The reactor setpoint are adjusted to second reactor setpoints after detection of initiation of the exothermic oligomerization reaction. The reactor system is maintained at the second reactor setpoints to allow the reaction mixture to react to form an oligomer mixture. The oligomer mixture is then introduced to a polymerization reactor system operating under melt polymerization conditions sufficient to polymerize the oligomer mixture to a Mw of at least 9,000 g/mol (PC) and to remove the phenolic byproduct from the oligomer mixture to form polycarbonate.

25 Claims, No Drawings

US 7,674,872 B2

METHOD OF PRODUCING HIGH MOLECULAR WEIGHT POLYMER

BACKGROUND

The present invention relates to the polymerization of aliphatic diols and diacids. Polycarbonate is a thermoplastic that has excellent mechanical properties such as impact resistance, heat resistance and transparency. Polycarbonates are widely used in applications ranging from football helmets to automobile parts to transparent security windows. More recently, polycarbonates have also proven to be the material of choice for optical media applications such as optical discs, for example compact discs (CD) and digital versatile discs (DVD). Conventional polycarbonates are usually produced by (1) an interfacial polymerization, in which bisphenol A (BPA) is reacted directly with phosgene or by (2) a melt polymerization process in which BPA is transesterified with a diaryl carbonate such as diphenylcarbonate (DPC) or an activated diaryl carbonate such as bismethylsalicylcarbonate (BMSC). For many applications, there has been a need for materials possessing the fundamental characteristics of transparency and toughness inherent in BPA polycarbonate but possessing, in addition, certain physical properties provided by the use of aliphatic compounds such as aliphatic dihydroxy compounds and/or aliphatic diacid compounds.

These aliphatic compounds however have been found difficult to use in melt transesterification reactions owing to the fact that they often have low boiling points and the prior art methods for polymerizing the aliphatic compounds can lead to low molecular weight polymer and/or polymer with undesired properties due to degradation or side reactions of the monomer during polymerization. It would be extremely beneficial to find a process where high molecular weight polycarbonate can be prepared using aliphatic dihydroxy and diacid compounds where the resulting polymer has high molecular weight and useful properties.

SUMMARY OF THE INVENTION

In one embodiment a method of forming polycarbonate comprises the steps of:
(a) introducing to a reactor system a reaction mixture comprising a diaryl carbonate (e.g. an activated diaryl carbonate such as bismethylsalicylcarbonate), a transesterification catalyst, an aliphatic dihydroxy compound, and a diacid compound (e.g. an aliphatic diacid compound such as dodecanedioic acid (DDDA) or $C_{36}$ hydrogenated dimer diacid),
(b) adjusting the temperature of the reactor system to a first reactor temperature setpoint and adjusting the pressure of the reactor system to a first reactor pressure setpoint between 0.7 bar and 1.2 bar, wherein the first reactor temperature setpoint is selected such that:
(i) it is sufficiently high to provide a molten reaction mixture,
(ii) it is sufficiently high to initiate an exothermic oligomerization reaction in the reaction mixture to form a polycarbonate oligomer and a phenolic byproduct, and
(iii) it is below the boiling point of the phenolic byproduct at the first reactor pressure, wherein during step (b) the reaction mixture is monitored to detect initiation of the exothermic oligomerization reaction,
(c) adjusting the temperature of the reactor system to a second reactor temperature setpoint and adjusting the pressure of the reactor system to a second reactor pressure setpoint that is greater than or equal to the first reactor pressure setpoint, after detection of initiation of the exothermic oligomerization reaction, wherein the second reactor temperature setpoint and second reactor pressure setpoint are selected in combination to:
(i) ensure that the reaction mixture is molten,
(ii) ensure that the temperature of the reaction mixture is below the boiling point of the phenolic byproduct at the second reactor pressure setpoint, and
(iii) maintain the oligomerization reaction in the reaction mixture,
(d) maintaining the reactor system at the second reactor temperature setpoint and the second reactor pressure setpoint for a sufficient period of time to allow the reaction mixture to react to form an oligomer mixture,
(e) introducing the oligomer mixture to a polymerization reactor system operating under melt polymerization conditions sufficient to polymerize the oligomer mixture to a Mw of at least 9,000 g/mol (PC) and to remove the phenolic byproduct from the oligomer mixture, thereby forming polycarbonate.

DETAILED DESCRIPTION OF INVENTION

The present invention may be understood more readily by reference to the following detailed description of preferred embodiments of the invention and the examples included herein. The present invention relates to the polymerization of low boiling point dihydroxy compounds (e.g. aliphatic dihydroxy compounds) and low boiling point diacids (e.g. aliphatic diacids) which typically have much slower reaction rates than dihydroxy compounds, with diaryl carbonate, (e.g. activated diaryl carbonate). The present inventors have found that by using the methods of the present invention volatilization, degradation, and side reactions of these low boiling point monomers can be minimized thereby producing polycarbonate having high molecular weight and many other desirable properties.

Definitions

As used in the specification and claims of this application, the following definitions should be applied.

"a", "an", and "the" as an antecedent refer to either the singular or plural. For example, "an aromatic dihydroxy compound" refers to either a single species of compound or a mixture of such species unless the context indicates otherwise.

The "polycarbonate" produced by the methods of the present invention is a copolyestercarbonate and refers to an oligomer or polymer comprising residues of at least one dihydroxy compound and/or diacid compound (also referred to as monomer compounds) joined by carbonate linkages. Nothing in the description and claims of this application should be taken as limiting the polycarbonate to only one dihydroxy and one diacid residue unless the context is expressly limiting. Thus, the application encompasses copolyestercarbonates with residues of 2, 3, 4, or more types of dihydroxy and/or diacid compounds. In one embodiment the methods of the present invention provides polycarbonate comprising residues of an aliphatic dihydroxy and a diacid (e.g. aliphatic or aromatic) compound and optionally an aromatic dihydroxy and/or diacid compound. In a preferred embodiment a method of the present invention provides polycarbonate comprising residues of an aliphatic dihydroxy and an aliphatic diacid compound.

The polycarbonate has a weight average molecular weight, Mw, that can be measured by gel permeation chromatography, GPC, using a crosslinked styrene-divinylbenzene column (SEC) and calibrated to a BPA polycarbonate (PC) reference or to a polystyrene (PS) reference. The SEC system should be calibrated if the control samples are outside tolerance limits or after each significant hardware modification, (for example replacement of a column and/or tubing etc.). Calibration standards of 13 different PS standards (ranging from 1,000 to 2,000,000 g/mol) and toluene are prepared to set up a calibration curve. The concentration used is 1 mg/ml for each individual standard. Analyze calibration standards and prepare a calibration curve based on the results. If results must be expressed as BPA-PC molecular mass, an additional calibration line should be constructed using at least 6 known broad molecular weight PC standards, creating a conversion factor from PS numbers to PC numbers.

It is noted that in one embodiment the polycarbonate's Mw (PC) (i.e. measured by GPC relative to BPA polycarbonate) is roughly one half the polycarbonate's Mw (PS) (i.e. measured by GPC relative to polystyrene). The polycarbonate will have a Mw (PC) of at least 9,000 g/mol. In certain embodiments of the invention, the polycarbonate will have a Mw (PC) in a range between 9,000 g/mol and 160,000 g/mol. In specific embodiments, the Mw (PC) is between 10,000 g/mol and 160,000 g/mol, for example between 12,000 g/mol and 160,000 g/mol, and preferably between 15,000 and 160,000 g/mol. In another embodiment, the Mw (PC) is between 20,000 g/mol and 102,000 g/mol.

The term "polycarbonate oligomer mixture" as it is used herein to describe the reaction mixture within the oligomerization system is herein understood to mean that at least partial reaction has occurred in the reaction mixture to produce polycarbonate oligomer having at least from 2 to 40 repeat units derived from dihydroxy compound(s). The polycarbonate oligomer mixture comprises a polycarbonate oligomer, a byproduct phenolic compound, and unreacted reactants from the initial reactants.

"Aliphatic" when used to describe dihydroxy and diacid monomer compound(s) are non-aromatic compounds. In one embodiment these include compounds having between one and forty or more carbon atoms in length.

"Repeat units" refers to the part of the dihydroxy or in the case of a copolyestercarbonate the diacid that is incorporated into the polycarbonate after reaction to form the polymer linkages. Such repeat units are referred to as "derived from" the corresponding dihydroxy (or diacid) compound.

"BPA" is herein defined as bisphenol A or 2,2-bis(4-hydroxyphenyl)propane.

The terms "aliphatic dihydroxy compound" and "aliphatic diol" are used interchangeably herein.

The term "low boiling" when used herein to described dihydroxy and/or diacid compounds is herein understood to mean that the referred to dihydroxy or diacid compound has substantial volatility at the boiling point of the phenolic byproduct (e.g. methyl salicylate) of the selected diaryl carbonate (e.g. bismethylsalicylcarbonate).

The Diaryl Carbonate:

In the melt production of polycarbonate, the compounds which react with the dihydroxy compounds to form carbonate linkages (the carbonate source) may be carbonate diesters, carbonyl halides, etc. Specific examples diaryl carbonates include: diphenylcarbonate, ditolyl carbonate, bis(chlorophenyl) carbonate, m-cresyl carbonate dinaphthyl carbonate, bis(diphenyl)carbonate, diethyl carbonate, dimethyl carbonate, dibutyl carbonate, dicyclohexyl carbonate, and other carbonate diesters, phosgene, and other carbonyl halides. Of the various compounds of this type and wherein the reactor system is cleaned using phenol as the phenolic compound, diphenylcarbonate is often preferred.

The diaryl carbonate can also be derived from an activated diaryl carbonate or a mixture of an activated diaryl carbonate with non-activated diaryl carbonate. A preferred activated carbonate of the present invention is an activated diaryl carbonate such as bismethylsalicylcarbonate (BMSC). However, as used herein the term "activated diaryl carbonate" is defined as a diaryl carbonate which is more reactive than diphenylcarbonate toward transesterification reactions. Such activated diaryl carbonates are of the general formula:

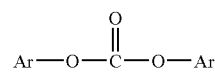

wherein Ar is a substituted aromatic radical having 6 to 30 carbon atoms. The preferred activated diaryl carbonates have the more specific general formula:

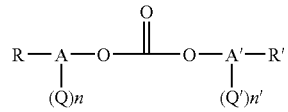

wherein Q and Q' are each independently activating groups. A and A' are each independently aromatic rings which can be the same or different depending on the number and location of their substituent groups, and n or n' are whole numbers of zero up to a maximum equivalent to the number of replaceable hydrogen groups substituted on the aromatic rings A and A', wherein a+a' is greater than or equal to 1. R and R' are each independently substituent groups such as alkyl, substituted alkyl, cycloalkyl, alkoxy, aryl, alkylaryl, cyano, nitro, halogen, and carboalkoxy. The number of R groups is a whole number and can be 0 up to a maximum equivalent to the number of replaceable hydrogen groups on the aromatic rings A minus the number n. The number of R' groups is a whole number and can be 0 up to a maximum equivalent to the number of replaceable hydrogen groups on the aromatic rings A minus the number n'. The number and type of the R and R' substituents on the aromatic ring are not limited unless they deactivate the carbonate and lead to a carbonate which is less reactive than diphenylcarbonate. Typically, the location of the R and R' substituents on the aromatic ring are any one or any combination of the para and/or two ortho positions.

Non-limiting examples of activating groups Q and Q' are: alkoxycarbonyl groups, halogens, nitro groups, amide groups, sulfone groups, sulfoxide groups, imine groups, or cyano groups with structures indicated below:

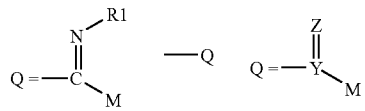

Y = C, N, S, SO
Z = O, N
M = N-Dialkyl, Alkyl, Aryl, Aryloxy, Alkoxy
R1 = Alkyl or Aryl
Q = Halogen or $NO_2$ Specific and non-limiting examples of activated carbonates include bis(o-methoxycarbonylphenyl)carbonate, bis(o- chlorophenyl)carbonate, bis(o-nitrophenyl)carbonate, bis(o-acetylphenyl)carbonate, bis(o-phenylketonephenyl)carbonate, bis(o-formylphenyl)carbonate, and bis(o-cyanophenyl) carbonate. Unsymmetrical combinations of these structures, where the substitution number and type on A and A' are different, are also possible to employ in the current invention. A preferred structure for an activated carbonate is an ester-substituted diaryl carbonate having the structure:

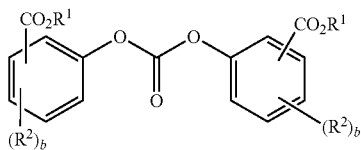

wherein $R^1$ is independently at each occurrence a $C_1$-$C_{20}$ alkyl radical, $C_4$-$C_{20}$ cycloalkyl radical, or $C_4$-$C_{20}$ aromatic radical; $R^2$ is independently at each occurrence a halogen atom, cyano group, nitro group, $C_1$-$C_{20}$ alkyl radical, $C_4$-$C_{20}$ cycloalkyl radical, $C_4$-$C_{20}$ aromatic radical, $C_1$-$C_{20}$ alkoxy radical, $C_4$-$C_{20}$ cycloalkoxy radical, $C_4$-$C_{20}$ aryloxy radical, $C_1$-$C_{20}$ alkylthio radical, $C_4$-$C_{20}$ cycloalkylthio radical, $C_4$-$C_{20}$ arylthio radical, $C_1$-$C_{20}$ alkylsulfinyl radical, $C_4$-$C_{20}$ cycloalkylsulfinyl radical, $C_4$-$C_{20}$ arylsulfinyl radical, $C_1$-$C_{20}$ alkylsulfonyl radical, $C_4$-$C_{20}$ cycloalkylsulfonyl radical, $C_4$-$C_{20}$ arylsulfonyl radical, $C_1$-$C_{20}$ alkoxycarbonyl radical, $C_4$-$C_{20}$ cycloalkoxycarbonyl radical, $C_4$-$C_{20}$ aryloxycarbonyl radical, $C_2$-$C_{60}$ alkylamino radical, $C_6$-$C_{60}$ cycloalkylamino radical, $C_5$-$C_{60}$ arylamino radical, $C_1$-$C_{40}$ alkylaminocarbonyl radical, $C_4$-$C_{40}$ cycloalkylaminocarbonyl radical, $C_4$-$C_{40}$ arylaminocarbonyl radical, or $C_1$-$C_{20}$ acylamino radical; and b is independently at each occurrence an integer 0-4. At least one of the substituents $CO_2R^1$ is preferably attached in an ortho position relative to the carbonate group.

Examples of preferred ester-substituted diaryl carbonates include but are not limited to bismethylsalicylcarbonate (BMSC) (CAS Registry No. 82091-12-1), bis(ethyl salicyl) carbonate, bis(propyl salicyl) carbonate, bis(butylsalicyl) carbonate, bis(benzyl salicyl) carbonate, bis(methyl 4-chlorosalicyl) carbonate and the like. Typically BMSC is preferred for use in melt polycarbonate synthesis due to its lower molecular weight and higher vapor pressure.

One method for determining whether a certain diaryl carbonate is activated or is not activated is to carry out a model transesterification reaction between the certain diaryl carbonate with a phenol such as para-cumyl phenol. This phenol is preferred because it possesses only one reactive site, possesses a low of volatility and possesses a similar reactivity to bisphenol A. The model transesterification reaction was carried out at temperatures above the melting points of the certain diaryl carbonate and para-cumyl phenol and in the presence of a transesterification catalyst, which is usually an aqueous solution of sodium hydroxide or sodium phenoxide. Preferred concentrations of the transesterification catalyst are about 0.001 mole % based on the number of moles of the phenol or diaryl carbonate. A preferred reaction temperature is 200° C. The choice of conditions and catalyst concentration can be adjusted depending on the reactivity of the reactants and melting points of the reactants to provide a convenient reaction rate. The only limitation to reaction temperature is that the temperature must be below the degradation temperature of the reactants. Sealed tubes can be used if the reaction temperatures cause the reactants to volatilize and effect the reactant molar balance. The determination of the equilibrium concentration of reactants is accomplished through reaction sampling during the course of the reaction and then analysis of the reaction mixture using a well-known detection method to those skilled in the art such as HPLC (high pressure liquid chromatography). Particular care needs to be taken so that reaction does not continue after the sample has been removed from the reaction vessel. This is accomplished by cooling down the sample in an ice bath and by employing a reaction quenching acid such as acetic acid in the water phase of the HPLC solvent system. It may also be desirable to introduce a reaction quenching acid directly into the reaction sample in addition to cooling the reaction mixture. A preferred concentration for the acetic acid in the water phase of the HPLC solvent system is 0.05 % (v/v). The equilibrium constant can be determined from the concentration of the reactants and product when equilibrium is reached. Equilibrium is assumed to have been reached when the concentration of components in the reaction mixture reach a point of little or no change on sampling of the reaction mixture. The equilibrium constant can be determined from the concentration of the reactants and products at equilibrium by methods well known to those skilled in the art. A diaryl carbonate which possesses an equilibrium constant of greater than 1 is considered to possess a more favorable equilibrium than diphenylcarbonate and is an activated carbonate, whereas a diaryl carbonate which possesses an equilibrium constant of 1 or less is considered to possess the same or a less favorable equilibrium than diphenylcarbonate and is considered not to be activated. It is generally preferred to employ an activated carbonate with very high reactivity compared to diphenylcarbonate when conducting transesterification reactions. Preferred are activated carbonates with an equilibrium constant greater than at least 10 times that of diaryl carbonate.

Some non-limiting examples of non-activating groups which, when present in an ortho position relative to the carbonate group, would not be expected to result in activated carbonates are alkyl and cycolalkyl. Some specific and non-limiting examples of non-activated carbonates are bis(o-methylphenyl)carbonate, bis(p-cumylphenyl)carbonate, and bis (p-(1,1,3,3-tetramethyl)butylphenyl)carbonate. Unsymmetrical combinations of these structures are also expected to result in non-activated carbonates.

Unsymmetrical diaryl carbonates wherein one aryl group is activated and one aryl is unactivated or de-activated would also be useful in this invention if the activating group renders the diaryl carbonate still more reactive than diphenylcarbonate.

The theoretical stoichiometry of the reaction within the melt polymerization reaction mixture requires a molar ratio of dihydroxy composition to diaryl carbonate composition of 1:1. However, in practicing the present invention the molar ratio in the melt reaction mixture is suitably between 0.25:1 to 3:1, more preferably 1:0.95 to 1:1.05 and more preferably 1:0.98 to 1:1.02.

The Phenolic Byproduct.

As a melt reaction proceeds using a diaryl carbonate and a monomer compound to form polycarbonate, the diaryl carbonate is consumed and a phenolic byproduct is generated. The phenolic byproduct is typically removed from reaction system to drive the polymerization reaction toward higher conversion. In one embodiment phenolic compound is added to form the reaction mixture to reduce the tendency of the reactants to react prior to their introduction into the oligomerization reactor. The structure of the phenolic byproduct will depend on what diaryl carbonate is employed as the carbonate source and thus can be an ester-substituted phenol or a nonester-substituted phenol. For example, if bismethylsalicylcarbonate (BMSC) is employed, a typical phenolic byproduct will be an ester-substituted phenol such as methyl salicylate. If diphenyl carbonate is employed, a typical phenolic byproduct will be a non-ester-substituted phenol such as phenol. Non-limiting examples of other suitable phenolic compounds are found in U.S. application Ser. No. 11/275,110 filed on Dec. 12, 2005 which is incorporated herein by reference for all purposes.

The Dihydroxy and Diacid Compound:

The polycarbonate of the present invention comprises repeat units derived from an aliphatic dihydroxy compound and a diacid compound with carbonate linkages derived from a diaryl carbonate. The following is a non-limiting list of such aliphatic dihydroxies and diacids.

Aliphatic Dihydroxy Compounds:
Isosorbide: 1,4:3,6-dianhydro-D-sorbitol, Tricyclodecanedimethanol (TCDDM),
4,8-Bis(hydroxymethyl)tricyclodecane, Tetramethylcyclobutanediol (TMCBD),
2,2,4,4,-tetramethylcyclobutane-1,3-diol, mixed isomers, cis/trans-1,4-Cyclohexanedimethanol (CHDM), cis/trans-1,4-Bis(hydroxymethyl)cyclohexane, cyclohex-1,4-ylenedimethanol,
trans-1,4-Cyclohexanedimethanol (tCHDM), trans-1,4-Bis(hydroxymethyl)cyclohexane,
cis-1,4-Cyclohexanedimethanol (cCHDM), cis-1,4-Bis(hydroxymethyl)cyclohexane,
cis-1,2,-cyclohexanedimethanol, 1,1'-bi(cyclohexyl)-4,4'-diol, dicylcohexyl-4,4'-diol,
4,4'-dihydroxybicyclohexyl, Poly(ethylene glycol), and $C_{36}$ branched fatty diol (CAS #147853-32-5). Isosorbide is often preferred.

Diacids (aliphatic and aromatic):
1,10-Dodecanedioic acid (DDDA), Adipic acid, Hexanedioic acid, Isophthalic acid,1,3-Benzenedicarboxylic acid, Terephthalic acid, 1,4-Benzenedicarboxylic acid, 2,6-Naphthalenedicarboxylic acid, 3-hydroxybenzoic acid (mHBA), and 4-hydroxybenzoic acid (pHBA).

In a preferred embodiment the diacid is an aliphatic diacid. A non-limiting list of suitable aliphatic diacids include:
1,10-Dodecanedioic acid (DDDA), Adipic acid, Hexanedioic acid, and $C_{36}$ hydrogenated dimer diacid (CAS #68783-41-5). DDDA and $C_{36}$ hydrogenated dimer diacid (CAS #68783-41-5) are often preferred.

The reaction mixture may optionally further comprise a dihydroxy aromatic compound. A preferred dihydroxy aromatic composition of the present invention is bisphenol A (BPA). However, other dihydroxy aromatic compounds of the present invention can be used and are selected from the group consisting of bisphenols having structure,

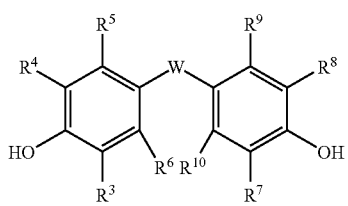

wherein $R^3$-$R^{10}$ are independently a hydrogen atom, halogen atom, nitro group, cyano group, $C_1$-$C_{20}$ alkyl radical, $C_4$-$C_{20}$ cycloalkyl radical, or $C_6$-$C_{20}$ C aryl radical; W is a bond, an oxygen atom, a sulfur atom, a $SO_2$ group, a $C_1$-$C_{20}$ aliphatic radical, a $C_6$-$C_{20}$ aromatic radical, a $C_6$-$C_{20}$ cycloaliphatic radical, or the group

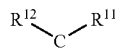

wherein $R^{11}$ and $R^{12}$ are independently a hydrogen atom, $C_1$-$C_{20}$ alkyl radical, $C_4$-$C_{20}$ cycloalkyl radical, or $C_4$-$C_{20}$ aryl radical; or $R^{11}$ and $R^{12}$ together form a $C_4$-$C_{20}$ cycloaliphatic ring which is optionally substituted by one or more $C_1$-$C_{20}$ alkyl, $C_6$-$C_{20}$ aryl, $C_5$-$C_{21}$, aralkyl, $C_5$-$C_{20}$ cycloalkyl groups, or a combination thereof; dihydroxy benzenes having structure

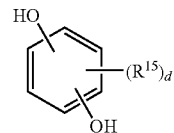

wherein $R^{15}$ is independently at each occurrence a hydrogen atom, halogen atom, nitro group, cyano group, $C_1$-$C_{20}$ alkyl radical, $C_4$-$C_{20}$ cycloalkyl radical, or $C_4$-$C_{20}$ aryl radical, d is an integer from 0 to 4; and dihydroxy naphthalenes having structures,

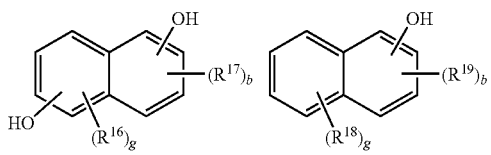

wherein $R^{16}$, $R^{17}$, $R^{18}$ and $R^{19}$ are independently at each occurrence a hydrogen atom, halogen atom, nitro group, cyano group, $C_1$-$C_{20}$ alkyl radical, $C_4$-$C_{20}$ cycloalkyl radical, or $C_4$-$C_{20}$ aryl radical; e and f are integers from 0 to 3, g is an integer from 0 to 4, and h is an integer from 0 to 2.

A list of suitable compounds having the above structures (e.g. bisphenols, dihydroxy benzenes, and dihydroxy naphthalenes) can be found in U.S. patent application Ser. No. 11/875,614 filed on Oct. 19, 2007, which is incorporated herein by reference for all purposes. Of these optional dihydroxy aromatic compounds the following are often considered to be preferred: BPA, resorcinol, methyl resorcinol, hydroquinone, methylhydroquinone, butylhydroquinone, DMBPC, and PPPBP.

In a preferred embodiment where the polycarbonate prepared is a copolycarbonate the second dihydroxy is BPA. It is preferred that the mole ratio of the aliphatic dihydroxy plus the aliphatic diacid to the aromatic dihydroxy compound is in an amount between 90:10 and 10:90, for example between 80:20 and 20:80, between 70:30 and 30:70, between 60:40 and 40:60; or 50:50.

The Transesterification Catalyst:

In one embodiment a catalyst (or catalyst system) will be added to the reaction components thereby forming a melt reaction mixture that is introduced to the reaction system to initiate molecular weight of the polycarbonate. The catalyst system used in this method of the present invention comprises a base, and preferably comprises at least one source of alkaline earth ions or alkali metal ions, and/or at least one quaternary ammonium compound, a quaternary phosphonium compound or a mixture thereof. In one embodiment it has been found preferable to only use alkaline earth ions or alkali metal ions, for example those derived from a caustic solution of NaOH. The source of alkaline earth ions or alkali metal ions being used in an amount such that the amount of alkaline earth or alkali metal ions present in the reaction mixture is in a range of between $10^{-5}$ and $10^{-8}$ moles alkaline earth or alkali metal ions per mole of dihydroxy and diacid compound employed.

The quaternary ammonium compound is selected from the group of organic ammonium compounds having structure,

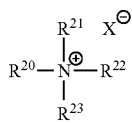

wherein $R^{20}$ to $R^{23}$ are independently a $C_1$-$C_{20}$ alkyl radical, $C_4$-$C_{20}$ cycloalkyl radical, or a $C_4$-$C_{20}$ aryl radical; and $X^-$ is an organic or inorganic anion. In one embodiment of the present invention anion $X^-$ is selected from the group consisting of hydroxide, halide, carboxylate, sulfonate, sulfate, formate, carbonate, and bicarbonate.

Non-limiting examples of suitable organic quaternary ammonium compounds are tetramethyl ammonium hydroxide, tetrabutyl ammonium hydroxide, tetramethyl ammonium acetate, tetramethyl ammonium formate and tetrabutyl ammonium acetate. Tetramethyl ammonium hydroxide is often preferred.

The quaternary phosphonium compound is selected from the group of organic phosphonium compounds having structure,

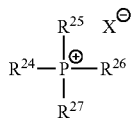

wherein $R^{24}$ to $R^{27}$ are independently a $C_1$-$C_{20}$ alkyl radical, $C^4$-$C^{20}$ cycloalkyl radical, or a $C_4$-$C_{20}$ aryl radical; and $X^-$ is an organic or inorganic anion. In one embodiment of the present invention anion $X^-$ is an anion selected from the group consisting of hydroxide, halide, carboxylate, sulfonate, sulfate, formate, carbonate, and bicarbonate. Suitable organic quaternary phosphonium compounds are illustrated by tetramethyl phosphonium hydroxide, tetramethyl phosphonium acetate, tetramethyl phosphonium formate, tetrabutyl phosphonium hydroxide, and tetrabutyl phosphonium acetate (TBPA). TBPA is often preferred.

Where $X^-$ is a polyvalent anion such as carbonate or sulfate it is understood that the positive and negative charges in the quaternary ammonium and phosphonium structures are properly balanced. For example, where $R^{20}$-$R^{23}$ are each methyl groups and X is carbonate, it is understood that $X^-$ represents $\frac{1}{2}$ ($CO_3^{-2}$).

Suitable sources of alkaline earth ions include alkaline earth hydroxides such as magnesium hydroxide and calcium hydroxide. Suitable sources of alkali metal ions include the alkali metal hydroxides illustrated by lithium hydroxide, sodium hydroxide and potassium hydroxide. Other sources of alkaline earth and alkali metal ions include salts of carboxylic acids, such as sodium acetate and derivatives of ethylene diamine tetraacetic acid (EDTA) such as EDTA tetrasodium salt, and EDTA magnesium disodium salt. Sodium hydroxide is often preferred. Further sodium hydroxide is often contained within the reaction components as an impurity and is contained in such an amount to catalyze the reaction without the addition of additional catalysts.

In order to initiate and achieve the formation of polycarbonate using the method of the present invention an effective amount of catalyst must be employed. The amount of catalyst employed is typically based upon the total number of moles of dihydroxy and diacid compounds employed in the polymerization reaction. When referring to the ratio of catalyst, for example phosphonium salt, to all dihydroxy and diacid compounds employed in the polymerization reaction, it is convenient to refer to moles of phosphonium salt per mole of the dihydroxy plus diacid compound(s), meaning the number of moles of phosphonium salt divided by the sum of the moles of each individual dihydroxy and diacid compound present in the reaction mixture. The amount of organic ammonium or phosphonium salts employed typically will be in a range between $1\times10^{-2}$ and $1\times10^{-6}$, preferably between $1\times10^{-4}$ and $1\times10^{-5}$ moles per mole of the dihydroxy and diacid compounds combined. The inorganic metal hydroxide catalyst typically will be used in an amount corresponding to between $1\times10^{-4}$ and $1\times10^{-8}$, preferably $1\times10^{-4}$ and $1\times10^{-7}$ moles of metal hydroxide per mole of the dihydroxy and diacid compounds combined. It is noted that diacids in the reaction mixture formulation typically require greater catalyst loadings than dihydroxies due to their typically slower reactivity and lack of direct incorporation to form a stable chemical bond upon reaction of the acid with carbonate.

In a third catalyst system according to the method of the present invention, solely an alkali metal hydroxide may be employed. As discussed above, alkali metal hydroxides are illustrated by sodium hydroxide, lithium hydroxide, and potassium hydroxide. Due to its relatively low cost, sodium hydroxide is often preferred.

Methods of Making Polycarbonate.

The methods of the present invention provide for the formation of high molecular weight polycarbonates having desirable properties using low boiling point monomers (e.g. both dihydroxy and diacid monomer). The low boiling monomers have atmospheric boiling points below the atmospheric boiling point of the phenolic byproduct of the diaryl carbonate used in the reaction mixture. The present inventors have found that because the monomers have atmospheric boiling points below the atmospheric boiling point of the phenolic byproduct of the diaryl carbonate that they can readily evaporate at moderate to high reaction temperature from the reaction mixture, thereby causing an imbalance in the stoichiometry desired for the oligomerization and polymerization reaction. Furthermore, many of these low boiling monomers can undergo degradation reactions and/or branching reactions and/or reactions to form chain-stopping byproducts (e.g. salicylic OH or Sal-OH) at moderate to high polymerization reaction conditions thereby resulting in product polycarbonate having undesirable properties. The present Inventors found that the methods of the present invention provide a favorable reaction profiles for the formation of polycarbonate using these low boiling monomers that solves the problems described above.

In a first embodiment of the present invention provides a method of producing polycarbonate. In a first step a reaction mixture is formed by combining a diaryl carbonate (preferably an activated diaryl carbonate such as bismethylsalicylcarbonate), a transesterification catalyst, an aliphatic dihydroxy compound, and a diacid compound (preferably an aliphatic diacid or an aromatic diacid having an atmospheric boiling point less than the atmospheric boiling point of the phenolic byproduct). These components are introduced separately, or in some combination thereof, as solids or liquids to a reactor system. The term "reactor system" as it is used herein is understood to mean one or more pieces of process equipment suitable for operating under the conditions specified herein. The process equipment of the reactor system are not particularly limited and can include, inter alia, stirred tanks, plug flow reactors, and/or other reactors having a reaction space and optionally having heat exchange equipment, for example jackets and/or heated or cooled circulation loops, and optionally other mixing means within their reaction space.

In one embodiment the reactants are introduced as solids into a jacketed stirred tank reactor and are stirred and heated until they are blended into a molten reaction mixture. In another embodiment, the individual reaction components are introduced in a molten form to a jacketed stirred tank reactor and are blended to form the reaction mixture. Various modes of addition of introducing the reaction components to the reaction system and various equipment configurations that make up the reaction system are contemplated and do not depart from the scope of the present invention.

In a second step the temperature of the reactor system is adjusted to a first reactor temperature setpoint. The pressure of the reactor system is also adjusted to a first reactor pressure setpoint between 0.7 bar and 1.2 bar. The first reactor temperature setpoint is selected such that it is sufficiently high to provide a molten reaction mixture. Where the reaction components are introduced to the reactor system in solid form, this temperature is high enough to melt the components into a molten reaction mixture. Where the reaction components are introduced to the reactor system in molten form, the first reactor temperature is high enough to ensure that the reaction components remain in molten form while in the reactor system. The first reactor temperature is also selected such that it is sufficiently high to initiate an exothermic oligomerization reaction between the free hydroxyl ends of the aliphatic dihydroxy and diacid and the activated diaryl carbonate. This exothermic oligomerization reaction generates heat and forms a phenolic byproduct. For example when bismethylsalicylcarbonate (BMSC) is used the phenolic byproduct is methyl salicylate (MS). Lastly, the first reactor temperature is selected such that it is below the boiling point of the phenolic byproduct at the first reaction pressure. For example where the first reactor pressure is atmospheric, the first reaction temperature will be at or below 230° C. (e.g. between 150° C. and 230° C., more preferably between 150 and 200° C., for example between 160° C. and 190° C.). In one embodiment the reactor is run at a first reaction pressure of between 0.8 bar and 1.2 bar (preferably at 0.8 bar) and the first reactor temperature setpoint is between 160° C. and 185° C., and more preferably between 165° C. and 180° C. (e.g. between 170° C. and 180° C.).

During the second step of the method of the present invention, the reaction mixture is monitored to detect the initiation of the exothermic oligomerization reaction. The initiation of the exothermic oligomerization reaction can be detected in at least two different ways. In a preferred embodiment the initiation of the oligomerization reaction can be determined by measuring temperature changes within the reaction mixture to determine the presence of an exotherm (e.g. spike in temperature) occurring within the reaction mixture. The temperature measurement can be made by using an infrared thermomeasuring device or by thermocouple analysis. In another preferred embodiment the initiation of the exothermic oligomerization reaction can be detected by testing for the presence of, or testing and measuring for an increase of the phenolic byproduct which would indicate that the activated diaryl carbonate is starting to be consumed by the oligomerization reaction. It has presently been found that the preferred method of monitoring the reaction mixture to determine the initiation of the exothermic reaction is to test for thermal changes within the reaction mixture.

In one embodiment, the exotherm onset can be measured in the following manner. At the onset of the exotherm the melt temperature begins to exceed the first setpoint temperature of the reactor system. This increase in temperature is generally quite rapid and large in magnitude. For example the melt temperature may exceed the oil temperature by up to 20° C. or more within 10 minutes. Therefore if the melt temperature exceeds the first setpoint temperature by 5° C. or more, it could be concluded that the exotherm has begun. If the reactor system has a very accurate melt temperature measurement system the exotherm onset may be observed even somewhat earlier. The melt temperature is typically measured by means of a thermocouple or thermometer. The thermocouple is optimally placed at the bottom of the reactor system where mixing of reactants is often best and also there is an optimum contact with the melt and a minimum of interference by the nitrogen or vacuum atmosphere blanket. Some reactor systems may not be equipped with a melt temperature device or the device may not be accurate. For example, the small scale reactor system used in some of the examples below may not equipped with a melt temperature measurement system. In those reactor systems, an increase in the temperature of the overhead system may be monitored instead. At the onset of the exotherm, the temperature of the overhead system increases due to distillation of the phenolic byproduct and perhaps small amounts of volatile monomers like Isosorbide (IS). This increase in the temperature of the overhead system above its setpoint is similarly rapid and large in magnitude like the increase in the melt temperature described above. Therefore if the overhead temperature increases by more then 5° C. above it's setpoint, this is an indication of the onset of the exotherm. The overhead temperature can be similarly measured as the melt temperature by means of thermocouples or thermometers.

In a third step, after it has been determined that the exothermic oligomerization reaction has been initiated, the temperature of the reactor system is adjusted to a second reactor temperature setpoint. Furthermore, the pressure of the reactor system is maintained at and/or adjusted to a second reactor pressure setpoint that is greater than or equal to the first reactor pressure setpoint. The second reactor pressure setpoint is preferably increased to a pressure that is above the first reactor setpoint pressure to help maintain the low boiling monomer compounds (e.g. the aliphatic dihydroxy and diacid components) as well as the byproduct phenolic compound in molten form rather than in gaseous form.

The reactor system temperature and pressure may be adjusted to the second setpoints together or separately and preferably occur within 30 minutes, more preferably within 15 minutes (e.g. within 5 minutes) of detecting initiation of the exothermic oligomerization reaction. In a most preferred embodiment the reactor system temperature and pressure are adjusted to the second setpoints immediately after initiation of the exothermic oligomerization reaction is detected.

The second reactor temperature setpoint and second reactor pressure setpoint are selected in combination to achieve the following conditions. The first condition is to ensure that the reaction mixture is molten form. The second condition is to ensure that the temperature of the reaction mixture is below the boiling point of the phenolic byproduct at the second reactor pressure setpoint. The third condition is to maintain the oligomerization reaction in the reaction mixture.

It is noted that the reaction mixture within the reactor system may be at some temperature equal to or above the second reactor temperature setpoint due to the fact that the oligomerization reaction is exothermic and is generating heat. By adjusting the reactor setpoint temperature from the first to the second temperature the temperature of the reaction mixture may be controlled to draw off energy created by the exothermic reaction. In actuality it may be the case that the reaction mixture in the reactor system may be at a temperature less than, equal to, or greater than the temperature of the reaction components in any of the first two steps described above. In a preferred embodiment the temperature of the reaction mixture is maintained at a temperature within 15° C. (e.g. between 5° C. and 10° C.) of the initiation temperature of the exothermic oligomerization reaction (e.g. the temperature of the molten reaction mixture in the second step, step (b)).

In one embodiment, once the initiation of the exothermic reaction is detected the reactor setpoint temperature is lowered to a second reactor temperature setpoint to draw off energy from the reaction mixture as the exothermic reaction proceeds. The present inventors have found that the present embodiment is useful in large scale reactor system where heat exchange between the reaction mixture and a "cooling" source is not optimal (e.g. in a larger scale jacketed continuously stirred reactor where heat exchange occurs through the walls of a reactor). In this embodiment the temperature of the reaction mixture within the reactor system may actually increase while energy is being drawn from the reactor by the use of the "cooling source". Nonetheless, in the present embodiment the second temperature setpoint is selected to be between 80° C. and 150° C. (e.g. between 100° C. and 140° C.), such that energy is drawn from the reaction system and the exothermic reaction to maintain the oligomerization reaction in the molten reaction mixture below the boiling point of the phenolic byproduct at the second reaction pressure.

In another embodiment, once the initiation of the exothermic reaction is detected the reactor setpoint temperature is maintained at a second reactor temperature setpoint to draw off energy from the reaction mixture as the exothermic reaction proceeds. The present inventors have found that the present embodiment is useful in a smaller scale reactor system and/or reactor systems where heat exchange between the reaction mixture and a "cooling" source is more easily and effectively achieved to cool the temperature of the reaction mixture within the reactor and withdraw energy derived from the exothermic reaction with the cooling source, for example cooling preferably to a temperature near the initiation temperature of the exothermic oligomerization reaction. The present embodiment has been found to be useful in reactor systems where heating exchange equipment is in intimate contact with the reaction mixture in the reactor. For example a reactor having cooled pipes or surfaces running in contact and/or through the reaction space can be used in the present embodiment. In this embodiment the temperature of the reaction mixture is more easily controlled using heat exchange equipment in direct contact with the reaction mixture rather than through a wall of the reactor system as described above.

The present inventors have found that a temperature control system is preferably employed to control the temperature of the reactor system and the reaction mixture during the second (e.g. (b)) and third (e.g. (c)) steps above. Here, the temperature of the reaction mixture is monitored and the set point temperature of the reaction system is controlled to maintain the reaction mixture at a desired temperature (e.g. by use of a first and second reactor set point temperature). Various methods of monitoring and controlling reactor and reaction mixture temperature prior to and during exothermic reactions are contemplated and are well-known in the art and do not depart from the scope of the present invention.

In a fourth step, the reactor system is maintained at the second reactor temperature setpoint and the second reactor pressure setpoint for a sufficient period of time to allow the reaction mixture to react to form an oligomer mixture. In one embodiment this is called equilibrating the reactants and is performed such that greater than 20% (e.g. more than 50% or more than 70%) of the aliphatic dihydroxy and diacid in the reaction mixture are allowed to react with each other and the activated diaryl carbonate to form oligomer polycarbonate. In another embodiment the reactor system is maintained at the second reactor temperature setpoint and the second reactor pressure setpoint for a period of time of more than 10 minutes, for example more than an hour, or more than 2 hours (e.g. more than 5 hours or 6 hours).

In preferred embodiment the reactor system is maintained at the second reactor temperature setpoint to provide a reaction mixture temperature of between 140° C. to 175° C., more preferably 145° C. to 165° C., and at the second reactor pressure setpoint 0.8 bar to 1.15 bar, more preferably between 0.90 bar to 1.1 bar (e.g. at atmospheric pressure where the first reactor pressure setpoint is sub-atmospheric), for a period of time between 10 minutes to 480 minutes, for example between 20 and 120 minutes. As indicated above, in a preferred embodiment the second reactor temperature setpoint and the amount of energy withdrawn from the reaction mixture during the exothermic reaction is selected such that the reaction mixture in the fourth step is at a temperature within 15° C. (e.g. between 5° C. and 10° C.) of the initiation temperature of the exothermic oligomerization reaction (e.g. the temperature of the molten reaction mixture in the second step, step (b))

In a fifth step, the oligomer mixture is introduced to a polymerization reactor system operating under melt polymerization conditions sufficient to polymerize the oligomer mixture to a Mw of at least 9,000 g/mol (based on PC standards) and to remove the phenolic byproduct from the oligomer mixture. As indicated above, several references disclose methods and equipment used to accomplish successful polymerization of oligomerized reaction mixtures, and such methods are not particularly limited herein. In preferred embodiments, the oligomer mixture is introduced to the plug flow polymerization reaction systems as described in U.S. patent application Ser. No. 11/863,723 and/or to reactive extruder polymerization systems as described in U.S. patent application Ser. Nos. 11/275,266 and 11/470,333, which are all incorporated herein by reference for all purposes, to effect removal of the by-product ester-substituted phenol while converting the oligomeric polycarbonate into a higher molecular weight product polycarbonate.

In one embodiment the polymerization reactor system is the same system as used to prepare the oligomer mixture. In this embodiment the polymerization reactor system and the oligomerization reactor system are one in the same. Therefore the step of introducing the oligomer mixture to a polymerization reaction system is accomplished by adjusting the reaction conditions within the reaction system to those where polymerization of the oligomerized reaction mixture occur.

In the present embodiment it has herein been found that all steps of the methods described (a) through (e) occur in a single piece of process equipment, for example a jacketed and stirred tank reactor system.

In one embodiment the polymerization reaction proceeds such that the product polycarbonate has a Mw (PC) greater than 9,000 g/mol (e.g. 10,000 g/mol), more preferably greater than 12,000 g/mol, greater than 15,000 g/mol, greater than 20,000 g/mol, greater than 25,000 g/mol. In specific embodiments, the melt transesterfication reaction proceeds such that the polycarbonate has a measured Mw (PC) is between 10,000 g/mol and 160,000 g/mol, for example between 12,000 g/mol and 160,000 g/mol, and preferably between 15,000 g/mol and 160,000 g/mol. In another embodiment, the melt transesterfication reaction proceeds such that the Mw (PC) is between 20,000 g/mol and 102,000 g/mol.

Blends of polymers are typical in industry. Thus the polycarbonate of the present invention may be blended with other polymeric materials, for example, other polycarbonates, polyestercarbonates, polyesters and olefin polymers such as ABS. Further, the polycarbonates of the present invention may be blended with conventional additives such as reinforcing agents, thermal stabilizers, radiation stabilizers, antioxidants, light stabilizers, UV stabilizers, plasticizers, visual effect enhancers, extenders, antistatic agents, catalyst quenchers, mold release agents, flame retardants, infrared shielding agents, whitening agents, blowing agents, anti-drip agents, impact modifiers and processing aids. These blends or polycarbonate of the present invention may be molded into various articles such as optical disks, optical lenses, automobile lamp components and the like. Thus, it is an aspect of the present invention to provide molded articles comprising the blends of polycarbonate and/or the polycarbonate of the present invention.

EXAMPLES

Having described the invention in detail, the following Examples are provided. The Examples should not be considered as limiting the scope of the invention, but merely as illustrative and representative thereof. (WE) as used herein is understood to mean "Working Example" while (CE) is understood to mean "Comparative Example". The terms "working" and "comparative" are simply used to demonstrate comparisons to other Examples. A comparative Example may or may not be an Example within the scope of the present invention.

A. Trials of Batch Oligomerization Method on Plug-Flow Reactor/Flash Devolatization/Reactive Extruder Hybrid System Example 1

Comparative—80/13/7 IS/BPA/C36 diacid Terpolymer

In Example 1 the monomer mix was prepared mixing 50364 g of bismethylsalicylcarbonate (BMSC), 17476 g of isosorbide (IS), 4436 g of BPA, 5932 g of $C_{36}$ hydrogenated dimer diacid. A catalyst ($6\times10^{-6}$ mol NaOH/mol IS) was added. The monomers were molten and oligomerization reaction was initiated at a tank temperature of 180° C. and a pressure of 800 mbar. The formulated BMSC/diol mol ratio was 1.02. As soon as a clear solution was obtained (around 45 minutes after heating started), agitation was started. At 153 minutes after start heating an exothermic peak was reached and at this point an overhead temperature of 165° C. was measured. After the exothermic peak had occurred the tank temperature setpoint was reduced to 150° C. and the pressure of the tank was increased to atmospheric pressure. At this point the oligomer was pumped through the preheater and plug flow reactor. The preheater and plug flow reactor were kept at a process temperature of 200° C. and a pressure of 4 bar. The oligomer throughput was 20 kg/hr and the residence time in the plug flow reactor was 5 minutes. At these conditions the oligomer at the exit of the plug flow reactor contained 58 wt % MS. The oligomer was then fed to the second preheater (220° C., 365 mbar) and it reached the flash vessel (210° C., 77 mbar). The oligomer was then fed to the extruder. At these conditions the oligomer leaving the flash reactor contained 2.3 wt % MS and had a Mw (PC) of 13362 g/mol. Extrusion at standard conditions rendered a polymer with an average Mw (PC) of only 23785 g/mol. No specific operational issues were observed during the run except for the fact that molecular weight of the polymer was quite low (profiles described in tables 1 & 2).

Example 2

Comparative—80/13/7 IS/BPA/C36 di-acid Terpolymer

In Example 2 the monomer mix was prepared mixing 56113 g of BMSC, 19548 g of IS, 4964 g of BPA, 6636 g of C36 di-acid. A catalyst ($6\times10^{-6}$ mol NaOH/mol IS) was added. The monomers were molten and oligomerization reaction was initiated at a tank temperature of 150° C. and a pressure of 800 mbar. The formulated BMSC/diol mol ratio was 1.016. As soon as a clear solution was obtained (around 45 minutes after heating started), agitation was started. At 129 minutes after start heating tank temperature was gradually increased in steps of 5° C. until an exotherm was initiated. This occurred at a temperature of 170° C. At 241 minutes after start heating an exothermic peak was reached. At this point an overhead temperature of 82° C. was measured. After the exothermic peak had occurred the tank temperature was reduced to 150° C. and the pressure of the tank was increased to atmospheric pressure. At this point the oligomer was pumped through the preheater and plug flow reactor. The preheater and plug flow reactor were kept at a process temperature of 150° C. and a pressure of 4 bar. The oligomer throughput was 25 kg/h. and the residence time in the plug flow reactor is 4 minutes. At these conditions the oligomer at the exit of the plug flow reactor contained 50 wt % MS. The oligomer was then fed to the second preheater (194° C., 150 mbar) and it reached the flash vessel (185° C., 50 mbar). The oligomer was then fed to the extruder. At these conditions the oligomer leaving the flash reactor contained 3.7 wt % MS and has a Mw (PC) of 12205 g/mol. Extrusion at standard conditions rendered a polymer with an average Mw (PC) 32096 g/mol. No operational issues were observed during the run (profiles described in tables 1 & 2).

Example 3

Working—80/13/7 IS/BPA/C36 di-acid Terpolymer

In Example 3 the monomer mix was prepared mixing 79883 g of BMSC, 27775 g of IS, 7050 g of BPA, 9428 g of C36 di-acid. A catalyst ($6\times10^{-6}$ mol NaOH/mol IS) was added. The monomers were molten and oligomerization reaction was initiated at a tank temperature of 170° C. and a pressure of 800 mbar. The formulated BMSC/diol mol ratio was 1.018. As soon as a clear solution was obtained (around 45 minutes after heating started), agitation was started. At 123 minutes after start heating the pressure of the tank was increased to atmospheric pressure. At the onset of the exotherm, at 130 minutes after start heating the tank temperature was reduced to 150° C. and at 145 minutes after start heating an exothermic peak was reached. At this point an overhead temperature of 82° C. was measured. When melt temperature dropped below 165° C. the oligomer was pumped through the preheater and plug flow reactor. The preheater and plug flow reactor were kept at a process temperature of 150° C. and a pressure of 4bar. The oligomer throughput was 25 kg/hr and the residence time in the plug flow reactor was 4 minutes. At these conditions the oligomer at the exit of the plug flow reactor contained 57 wt % MS. The oligomer was then fed to the second preheater (200° C., 150 mbar) and it reached the flash vessel (190° C., 50 mbar). The oligomer was then fed to the extruder. Extrusion at standard conditions rendered a polymer with an average Mw (PC) 32004 g/mol. No operational issues were observed during the run (profiles described in tables 1 & 2).

Example 4

Working—80/13/7 IS/BPA/C36 di-acid Terpolymer

In Example 4 a monomer mix was prepared by mixing 79896 g of BMSC, 27723 g of IS, 7039 g of BPA, 9411 g of C36 di-acid. A catalyst ($6\times10^{-6}$ mol NaOH/mol IS) was added. The monomers were molten and oligomerization reaction was initiated at a tank temperature of 170° C. and a pressure of 800 mbar. The formulated BMSC/diol mol ratio was 1.02. As soon as a clear solution was obtained (45 minutes after heating started), agitation was started. At the onset of the exotherm, at 218 minutes after start heating the pressure of the tank was increased to atmospheric pressure and the tank temperature was reduced to 150° C. and at 227 minutes after start heating an exothermic peak was reached. At this point an overhead temperature of 93° C. was measured. When melt temperature dropped below 175° C. the oligomer was pumped through the preheater and plug flow reactor. The preheater and plug flow reactor were kept at a process temperature of 150° C. and a pressure of 4 bar. The oligomer throughput was 25kg/hr and the residence time in the plug flow reactor was 4 minutes. At these conditions the oligomer at the exit of the plug flow reactor contained 57 wt % MS. The oligomer was then fed to the second preheater (200° C., 150mbar) and it reached the flash vessel (200° C., 150mbar). The oligomer was then fed to the extruder. Extrusion at standard conditions rendered a polymer with an average Mw (PC) 30259 g/mol. No operational issues were observed during the run (profiles described in tables 1 & 2).

TABLE 2

T-t-P data polymerization

| Example no. | polymerisation start time min. | P mBar | oil temp ° C. | oligomer temp ° C. | avg. polymer PC Mw |
|---|---|---|---|---|---|
| 1 | 238 | atm | 150 | 162 | 23785 |
| 2 | 261 | atm | 150 | 162 | 32096 |
| 3 | 298 | atm | 150 | 163 | 32004 |
| 4 | 231 | atm | 150 | 171 | 30259 |

It can be seen that in Example 1 oligomer samples more Iso-SalOH (a chain-stopping byproduct that inhibits further molecular weight increases) is formed than in Example 4. (See table 3 Polymer H-NMR data)

TABLE 3

Oligomer H1 NMR Data

| Example no. | BPA-SalOH ppm | Iso-SalOH ppm | TMsC mol % | IMsC mol % | PC-OH ppm |
|---|---|---|---|---|---|
| 1 | — | 2265 | 7.38 | <0.05 | 2214 |
| 2 | — | nm | nm | nm | nm |
| 3 | — | 1384 | 5.61 | 2.37 | 1346 |
| 4 | — | 1092 | 4.90 | 2.15 | 1359 |

It can be seen in Example 1 that the polymer samples had more Iso-SalOH (a chain-stopping byproduct that inhibits further molecular weight increases) and IMSC compared to Example 4 (See table 4 Polymer H-NMR data)

TABLE 4

Polymer H1 NMR data

| Example no. | BPA-SalOH ppm | Iso-SalOH ppm | TMsC mol % | IMsC mol % | PC-OH ppm |
|---|---|---|---|---|---|
| 1 | <5 | 175 | 0.50 | 1.69 | 106 |
| 2 | <5 | 154 | 0.77 | 0.64 | 86 |
| 3 | <5 | 118 | 0.99 | 0.70 | 79 |
| 4 | <5 | 140 | 0.97 | 0.85 | 58 |

Comparing Examples 1 and 4 (exact same molar stoichiometry of reactants), it has been found beneficial herein to, inter alia:
(I.) carry out the exothermic reaction at atmospheric conditions as opposed to reduced pressure conditions;
(II.) minimize the temperatures in the preheater, plug flow reactor and flash devolatization unlit to less than 200° C.; and

TABLE 1

T-t-P data oligomerization

| Example no. | oligomerisation BMSC/diol ratio | cat eq. | P initial (prior to onset of exotherm) mBar | initial oil temp ° C. | exotherm time min. | exotherm temp ° C. | P at onset of exotherm mBar | oil-temp at exotherm ° C. | overhead temp ° C. |
|---|---|---|---|---|---|---|---|---|---|
| 1 | 1.020 | 6 | 800 | 180 | 153 | 222 | 800 | 180 | 165 |
| 2 | 1.016 | 6 | 800 | 150 | 241 | 186 | 800 | 150 | 82 |
| 3 | 1.018 | 6 | 800 | 170 | 145 | 192 | atm | 150 | 82 |
| 4 | 1.020 | 6 | 800 | 170 | 227 | 206 | atm | 150 | 93 |

(III.) carry out the process so that the overhead temperature is maintained below 100° C. (no substantial devolatization of monomer).

B. Laboratory Experiments

The following materials were used in the following Examples:

| Component | Supplier |
|---|---|
| Isosorbide, containing approx. 15-20 ppm sodium | Roquette |
| BMSC (bis(methylsalicyl) carbonate) | SABIC Innovative Plastics |
| Sodium hydroxide | Sigma Aldrich |

A series of small-scale oligomerization and polymerization reactions were carried out in a glass tube reactor, which was equipped with a vacuum system. Before charging the monomers the glass reactor tube was soaked in 1M HCl for at least 24 hours to remove any sodium present at the surface of the glass. After this acid bath the glass tube was rinsed using 18.2 MW (Milli-Q quality) water for at least 5 times. The batch reactor tube was charged at ambient temperature and pressure with 8.76 grams of solid isosorbide, and 20.00 g of the solid BMSC thus using a molar ratio of 1.01:1 (BMSC:isosorbide). After this the reactor system was sealed shut, the system was deoxygenated by briefly evacuating the reactor and then introducing nitrogen. This process was repeated three times. 100l of the catalyst (0.5 M aqueous NaOH) was added to the reactor as an aqueous solution at a concentration of $40 \times 10^{-6}$ mol NaOH per mol isosorbide.

The temperature of the reactor was maintained using a heating mantle in intimate contact with the reaction mixture within the reactor with a PID controller to effectively control the temperature of the reaction mixture within the reactor at or near the reactor setpoint temperature. The pressure over the reactor was controlled by a nitrogen bleed into the vacuum pump downstream of the distillate collection flasks and measured with a pressure gauge. The reactor was brought to near atmospheric pressure and reaction time is started at the same moment as the heater is switched on. In the initial phase of the reaction scheme the oligomerization reaction occurs at near atmospheric pressure and a temperature of 170° C. The oligomerization reaction occurs and the pressure is reduced and temperature is increased to polymerize the mixture and remove phenolic byproduct from the reaction mixture. The reactions were carried out according to the conditions in Tables 5 and 6. In Table 5 and 6, "Tr" is the setpoint temperature of the reactor; and "To" is the setpoint temperature of the overhead. The vacuum system removed the methyl salicylate byproduct, which was condensed in condensers. The product was recovered by removing a drain nut at the bottom of each reactor.

TABLE 5

| Time | Remarks |
|---|---|
| 0:00:00 | Set $T_r$ @ 170° C.; $T_o$ @ 100° C.; Pressure @ 100 kPa |
| 0:06:00 | Start stirrers at approximately 300 rpm |
| 0:15:00 | Set P @ 50 kPa |
| 0:30:00 | Set $T_r$ @ 230° C. |
| 0:45:00 | Set $T_r$ @ 270° C. and P at 0 kPa |
| 0:50:00 | Open reactor to vent |
| 0:54:00 | Stop |

TABLE 6

| Time | Remarks |
|---|---|
| 0:00:00 | Set $T_r$ at 170° C.; $T_o$ at 100° C., pressure at 100 kPa |
| 0:06:00 | Set stirrer at approximately 300 rpm |
| 0:15:00 | Set $T_r$ at 230° C. |
| 0:30:00 | Set P at 50 kPa |
| 0:45:00 | Set $T_r$ at 270° C. and P at 0 kPa |
| 0:50:00 | Open reactor to vent |
| 0:54:00 | Stop |

The weight average molecular weight of the product polymer was characterized by gel permeation chromatography and is expressed against PC standards. The results are shown in Table 7 and illustrate that Mw build can be altered by varying reactor temperature and pressure over the course of the reaction profile.

TABLE 7

| Name | Mw (g/mol) | Mn (g/mol) | Mw(PC) (g/mol) | Mn(PC) (g/mol) | IS-SalOH (ppm) | TMSC (mol%) |
|---|---|---|---|---|---|---|
| Table 5 | 14660 | 6761 | 7861 | 4962 | 25 | 40 |
| Table 6 | 36969 | 12637 | 20135 | 6883 | 1370 | 2 |

The invention claimed is:

1. A method of forming polycarbonate comprising the steps of:
   (a) introducing to a reactor system a reaction mixture comprising a diaryl carbonate, a transesterification catalyst, an aliphatic dihydroxy compound, and a diacid compound,
   (b) adjusting the temperature of the reactor system to a first reactor temperature setpoint and adjusting the pressure of the reactor system to a first reactor pressure setpoint between 0.7 bar and 1.2 bar, wherein the first reactor temperature setpoint is selected such that:
      (i) it is sufficiently high to provide a molten reaction mixture,
      (ii) it is sufficiently high to initiate an exothermic oligomerization reaction in the reaction mixture to form a polycarbonate oligomer and a phenolic byproduct, and
      (iii) it is below the boiling point of the phenolic byproduct at the first reactor pressure,
   wherein during step (b) the reaction mixture is monitored to detect initiation of the exothermic oligomerization reaction,
   (c) adjusting the temperature of the reactor system to a second reactor temperature setpoint and adjusting the pressure of the reactor system to a second reactor pressure setpoint that is greater than or equal to the first reactor pressure setpoint, after detection of initiation of the exothermic oligomerization reaction,
   wherein the second reactor temperature setpoint and second reactor pressure setpoint are selected in combination to:
      (i) ensure that the reaction mixture is molten,
      (ii) ensure that the temperature of the reaction mixture is below the boiling point of the phenolic byproduct at the second reactor pressure setpoint, and
      (iii) maintain the oligomerization reaction in the reaction mixture,
   (d) maintaining the reactor system at the second reactor temperature setpoint and the second reactor pressure setpoint for a sufficient period of time to allow the reaction mixture to react to form an oligomer mixture, (e) introducing the oligomer mixture to a polymerization reactor system operating under melt polymerization conditions sufficient to polymerize the oligomer mixture to a Mw of at least 9,000 g/mol (PC) and to remove the phenolic byproduct from the oligomer mixture, thereby forming polycarbonate.

2. The method of claim 1, wherein during step (b) the reaction mixture is monitored to detect initiation of the exothermic oligomerization reaction by monitoring the temperature of the reaction mixture to detect an exotherm indicating the initiation of the oligomerization reaction, by monitoring the concentration of phenolic byproduct in the reaction mixture to detect the initiation of the oligomerization reaction, or a combination thereof.

3. The method of claim 1, wherein the diacid compound comprises an aliphatic diacid compound.

4. The method of claim 3, wherein the aliphatic dihydroxy compound comprises isosorbide and the aliphatic diacid compound DDDA, $C_{36}$ hydrogenated dimer diacid, or both DDDA and $C_{36}$ hydrogenated dimer diacid.

5. The method of claim 1, wherein the diaryl carbonate is an activated diaryl carbonate.

6. The method of claim 5, wherein the activated diaryl carbonate is bismethylsalicylcarbonate.

7. The method of claim 1, wherein the reaction mixture further comprises an aromatic dihydroxy compound selected from the group consisting of: BPA, hydroquinone, resorcinol, methylhydroquinone, methylresorcinol, DMBPC, and PPPBP.

8. The method of claim 1, wherein the first reaction pressure is below atmospheric pressure and wherein the second reaction pressure is at or above atmospheric pressure.

9. The method of claim 1, wherein the first reactor temperature setpoint is between 150° C. and 230° C. and wherein the second reactor temperature setpoint is between 80° C. and 150° C.

10. The method of claim 1, wherein the reaction mixture is maintained in step (d) at a temperature within 15° C. of the temperature of the molten reaction mixture in step (b).

11. The method of claim 1, wherein steps (a), (b), (c), and (d) occur in a stirred tank reactor and step (e) occurs in a plug flow reactor, a reactive extruder, or both a plug flow reactor and reactive extruder.

12. The method of claim 1, wherein steps (a), (b), (c), (d), and (e) occur in a stirred tank reactor.

13. The method of claim 1, wherein step (c) occurs 15 minutes or less after detection of initiation of the exothermic oligomerization reaction.

14. The method of claim 13, wherein step (c) occurs 5 minutes or less after detection of initiation of the exothermic oligomerization reaction.

15. A method of forming polycarbonate comprising the steps of:

(a) introducing to a reactor system a reaction mixture comprising an activated diaryl carbonate, a transesterification catalyst, an aliphatic dihydroxy compound, and an aliphatic diacid compound, (b) adjusting the temperature of the reactor system to a first reactor temperature setpoint and adjusting the pressure of the reactor system to a first reactor pressure setpoint between 0.7 bar and 1.2 bar, wherein the first reactor temperature setpoint is selected such that:

(i) it is sufficiently high to provide a molten reaction mixture, (ii) it is sufficiently high to initiate an exothermic oligomerization reaction in the reaction mixture to form a polycarbonate oligomer and a phenolic byproduct, and (iii) it is below the boiling point of the phenolic byproduct at the first reactor pressure, wherein during step (b) the reaction mixture is monitored to detect initiation of the exothermic oligomerization reaction, (c) adjusting the temperature of the reactor system to a second reactor temperature setpoint and adjusting the pressure of the reactor system to a second reactor pressure setpoint that is greater than or equal to the first reactor pressure setpoint, after detection of initiation of the exothermic oligomerization reaction, wherein the second reactor temperature setpoint and second reactor pressure setpoint are selected in combination to:

(i) ensure that the reaction mixture is molten, (ii) ensure that the temperature of the reaction mixture is below the boiling point of the phenolic byproduct at the second reactor pressure setpoint, and (iii) maintain the oligomerization reaction in the reaction mixture, (d) maintaining the reactor system at the second reactor temperature setpoint and the second reactor pressure setpoint for a sufficient period of time to allow the reaction mixture to react to form an oligomer mixture, (e) introducing the oligomer mixture to a polymerization reactor system operating under melt polymerization conditions sufficient to polymerize the oligomer mixture to a Mw of at least 9,000 g/mol and to remove the phenolic byproduct from the oligomer mixture, thereby forming polycarbonate.

16. The method of claim 15, wherein during step (b) the reaction mixture is monitored to detect initiation of the exothermic oligomerization reaction by monitoring the temperature of the reaction mixture to detect an exotherm indicating the initiation of the oligomerization reaction, by monitoring the concentration of phenolic byproduct in the reaction mixture to detect the initiation of the oligomerization reaction, or a combination thereof.

17. The method of claim 15, wherein the aliphatic dihydroxy compound comprises isosorbide the aliphatic diacid compound DDDA, $C_{36}$ hydrogenated dimer diacid, or both DDDA and $C_{36}$ hydrogenated dimer diacid and the activated diaryl carbonate comprises bismethylsalicylcarbonate.

18. The method of claim 1, wherein the reaction mixture further comprises an aromatic dihydroxy compound selected from the group consisting of: BPA, hydroquinone, resorcinol, methylhydroquinone, methylresorcinol, DMBPC, and PPPBP.

19. The method of claim 15, wherein the first reaction pressure is below atmospheric pressure and wherein the second reaction pressure is at or above atmospheric pressure.

20. The method of claim 15, wherein the first reaction temperature setpoint is between 150° C. and 230° C. and wherein the second reaction temperature setpoint is between 80° C. and 150° C.

21. The method of claim 15, wherein the reaction mixture is maintained in step (d) at a temperature within 15° C. of the temperature of the molten reaction mixture in step (b).

22. The method of claim 15, wherein steps (a), (b), (c), and (d) occur in a stirred tank reactor and step (e) occurs in a plug flow reactor, a reactive extruder, or both a plug flow reactor and reactive extruder.

23. The method of claim 15, wherein steps (a), (b), (c), (d), and (e) occur in a stirred tank reactor.

24. The method of claim 15, wherein step (c) occurs 15 minutes or less after detection of initiation of the exothermic oligomerization reaction.

25. The method of claim 24, wherein step (c) occurs 5 minutes or less after detection of initiation of the exothermic oligomerization reaction.

* * * * *